United States Patent
Forsman et al.

(10) Patent No.: US 9,807,137 B2
(45) Date of Patent: Oct. 31, 2017

(54) VIRTUALIZATION IN ADAPTIVE STREAM CREATION AND DELIVERY

(71) Applicant: ERICSSON TELEVISION INC., Duluth, GA (US)

(72) Inventors: Robert Hammond Forsman, Sugar Hill, GA (US); Chris Phillips, Hartwell, GA (US); Jennifer Ann Reynolds, Duluth, GA (US); Charles Hammett Dasher, Lawrenceville, GA (US); Steve Martin, Centennial, CO (US)

(73) Assignee: ERICSSON AB, Stockholm (SE)

( * ) Notice: Subject to any disclaimer, the term of this patent is extended or adjusted under 35 U.S.C. 154(b) by 377 days.

(21) Appl. No.: 14/271,201

(22) Filed: May 6, 2014

(65) Prior Publication Data

US 2014/0244732 A1  Aug. 28, 2014

Related U.S. Application Data

(63) Continuation of application No. 13/329,443, filed on Dec. 19, 2011.

(51) Int. Cl.
| | |
|---|---|
| G06F 15/16 | (2006.01) |
| H04L 29/06 | (2006.01) |
| H04N 21/643 | (2011.01) |
| H04N 21/658 | (2011.01) |
| H04N 21/845 | (2011.01) |

(52) U.S. Cl.
CPC .......... *H04L 65/60* (2013.01); *H04L 65/4084* (2013.01); *H04L 65/602* (2013.01); *H04L 65/607* (2013.01); *H04N 21/64322* (2013.01); *H04N 21/6581* (2013.01); *H04N 21/8456* (2013.01)

(58) Field of Classification Search
CPC ...................................................... H04L 65/607
USPC ................ 709/203, 217, 219, 230, 231, 250
See application file for complete search history.

(56) References Cited

U.S. PATENT DOCUMENTS

| | | | |
|---|---|---|---|
| 4,827,513 A * | 5/1989 | Austin | 380/36 |
| 5,933,603 A * | 8/1999 | Vahalia et al. | 709/225 |
| 6,956,593 B1 | 10/2005 | Gupta et al. | |
| 2002/0161847 A1 | 10/2002 | Weigand et al. | |
| 2004/0181667 A1 | 9/2004 | Venters et al. | |
| 2004/0261028 A1 | 12/2004 | Cotarmanac'h | |
| 2005/0210394 A1* | 9/2005 | Crandall et al. | 715/752 |
| 2006/0050697 A1 | 3/2006 | Li et al. | |
| 2007/0294500 A1 | 12/2007 | Falco et al. | |
| 2008/0034276 A1* | 2/2008 | Ficco | 715/201 |
| 2008/0279205 A1* | 11/2008 | Sgouros et al. | 370/408 |
| 2009/0164652 A1 | 6/2009 | Slobotskoy et al. | |
| 2009/0315889 A1* | 12/2009 | Tognola | 345/440 |

(Continued)

FOREIGN PATENT DOCUMENTS

| | | |
|---|---|---|
| CN | 101030938 | 5/2007 |
| CN | 102238434 A | 9/2011 |
| WO | WO 2005/017779 A1 | 2/2005 |

*Primary Examiner* — Viet Vu

(57) ABSTRACT

An adaptive streaming server, a method, and a system are described herein that create a content stream to be delivered to one or more clients by segmenting the content into data structures which are stored in random access memory (volatile storage) rather than segmenting the content into segment files which are stored on a disk or database (non-volatile storage).

18 Claims, 11 Drawing Sheets

(56) References Cited

U.S. PATENT DOCUMENTS

| | | |
|---|---|---|
| 2010/0046914 A1* | 2/2010 | O'Connor ....................... 386/83 |
| 2010/0306552 A1 | 12/2010 | LeVine et al. |
| 2011/0033170 A1 | 2/2011 | Ikeda et al. |
| 2011/0274179 A1 | 11/2011 | Holden |
| 2011/0276744 A1* | 11/2011 | Sengupta et al. ............. 711/103 |
| 2011/0307627 A1* | 12/2011 | Weigand et al. ............. 709/231 |
| 2013/0304916 A1* | 11/2013 | Hodapp ....................... 709/224 |

* cited by examiner

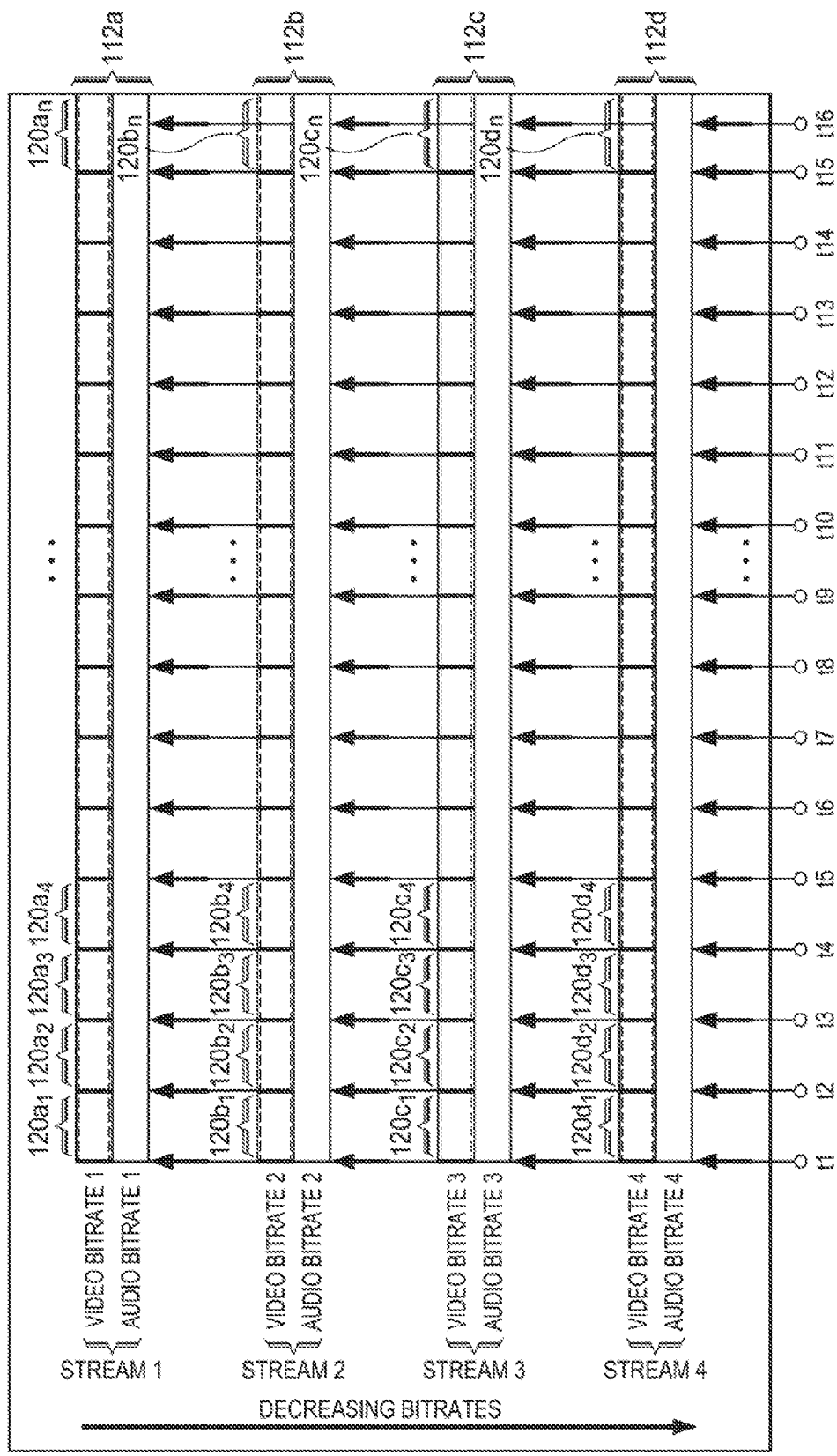

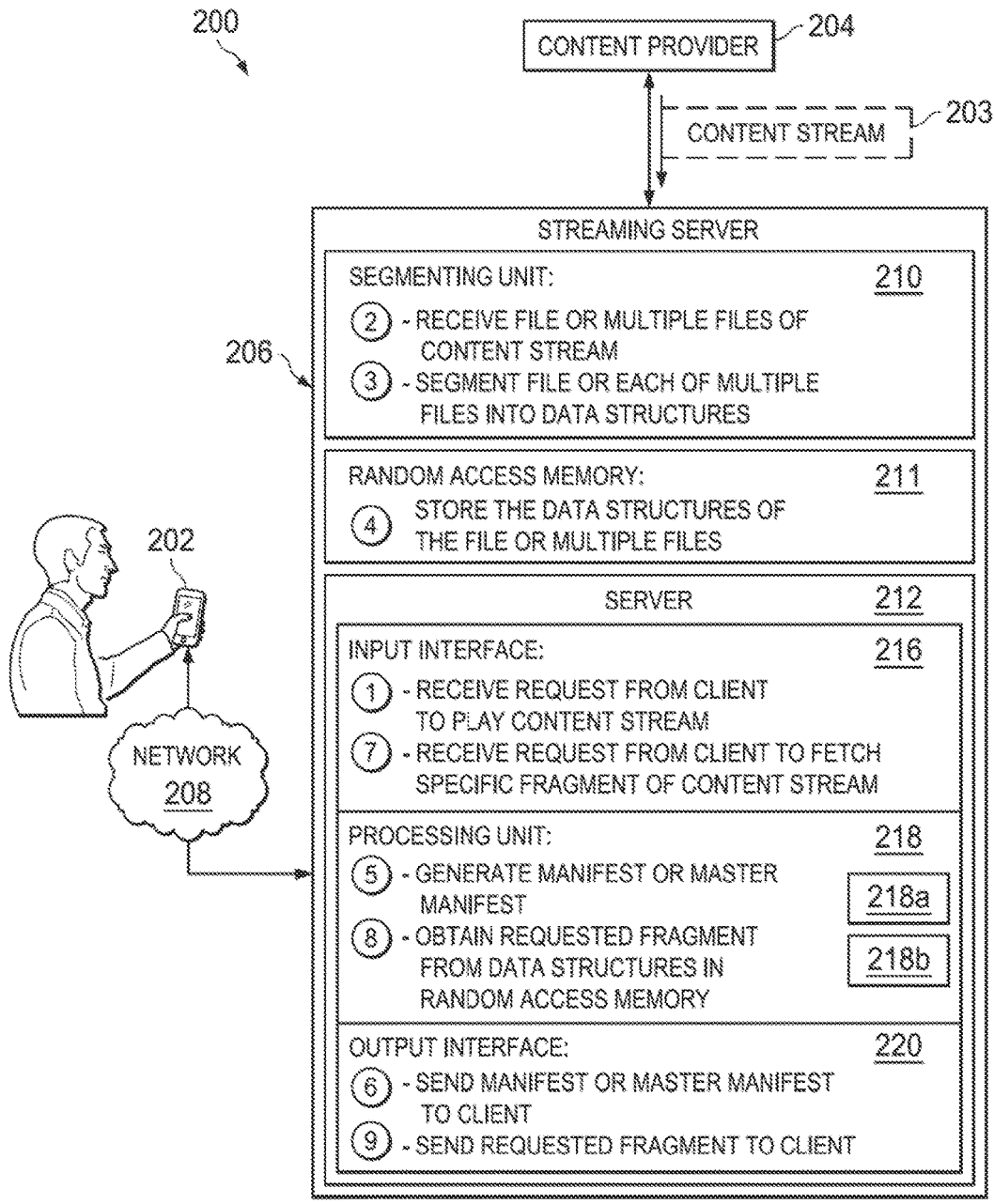

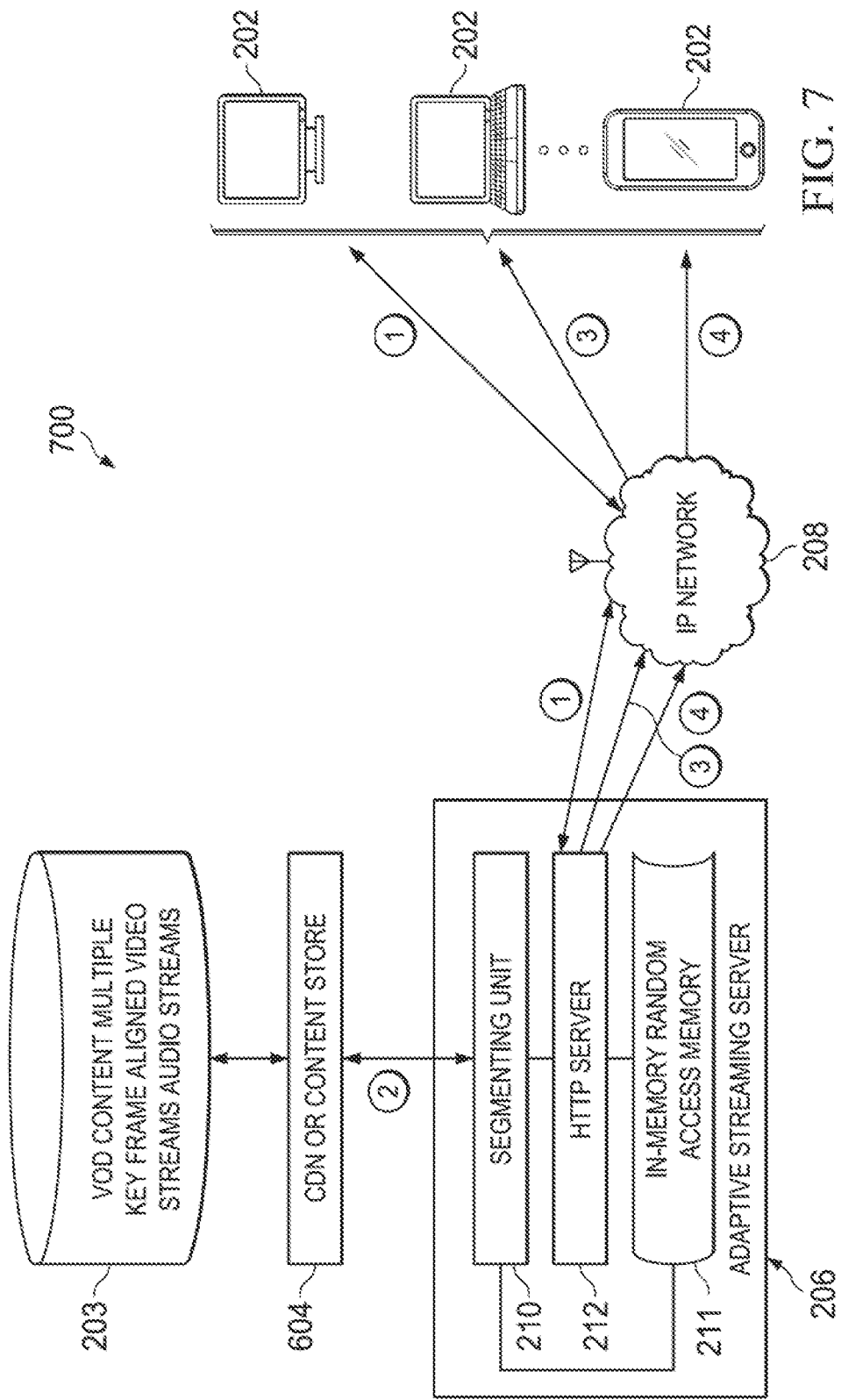

VIRTUALIZATION IN ADAPTIVE STREAM CREATION AND DELIVERY

CLAIM OF PRIORITY

This application is a continuation application of U.S. patent application Ser. No. 13/329,443, filed Dec. 19, 2011, now U.S. Pat. No. 8,762,452. The contents of this document are hereby incorporated by reference herein.

TECHNICAL FIELD

The present invention relates to a streaming server, a method, and a system that creates a content stream to be delivered to one or more clients by segmenting the content into data structures which are stored in random access memory (volatile storage) rather than segmenting the content into segment files which are stored on a disk or database (non-volatile storage).

BACKGROUND

The following abbreviations and terms are herewith defined, at least some of which are referred to within the following description about at least the prior art and/or the present invention.
CDN Content Distribution Network
HLS HTTP Live Streaming
HTTP Hypertext Transfer Protocol
IP Internet Protocol
MPEG Moving Picture Experts Group
MRTG Multi Router Traffic Grapher
RTP Real Time Transport Protocol
RTSP Real Time Streaming Protocol
SNMP Simple Network Management Protocol
Volatile Storage (volatile memory): is computer memory that requires power to maintain the stored information, unlike non-volatile memory which does not require a maintained power supply. Most forms of modern random access memory (RAM) are volatile storage, including dynamic random access memory (DRAM) and static random access memory (SRAM). Content addressable memory and dual-ported RAM are usually implemented using volatile storage.
Non-Volatile Storage (Non-volatile memory): is computer memory that can retain the stored information even when not powered. Examples of non-volatile memory include read-only memory, flash memory, ferroelectric RAM, most types of magnetic computer storage devices (e.g. hard disks, floppy disks, and magnetic tape), optical discs, and early computer storage methods such as paper tape and punched cards.

Adaptive bitrate streaming is a technique used by an adaptive streaming server for streaming multimedia over one or more networks to user devices (e.g., computers, mobile communication devices, tablets, smart phones). While in the past most video streaming technologies utilized streaming protocols such RTP with RTSP, today's adaptive streaming technologies are mostly based on HTTP and are designed to work efficiently over large distributed HTTP networks such as the Internet.

HTTP adaptive bit rate streaming requires that the adaptive streaming server have multiple files of the content stream (source video, multimedia) which are encoded at different bit rates. The adaptive streaming server then switches between streaming the different encodings of the content file based on requests received from the user's device. The result of the HTTP stream is that the user's device experiences very little buffering and a fast start time so the user has a good experience for both high-end and low-end network connections. Today, there are several HTTP adaptive bit rate streaming technologies that can be used by an adaptive streaming server for streaming multimedia over networks such as the Internet to user devices. For example, Apple's HTTP Live Stream (HLS) m3u8 file system is one such HTTP adaptive bit rate streaming technology where a "manifest" file is created to reference many video segments which are updated in real time to play in a particular order. Other HTTP adaptive bit rate streaming technologies include Adobe's Dynamic stream for Flash, Microsoft's Smooth Streaming etc. . . .

Referring to FIGS. 1A-1D (PRIOR ART), there several diagrams used to help explain how a traditional system 100 can implement a HTTP adaptive bit rate streaming technology. As shown in FIG. 1A (PRIOR ART), the traditional system 100 includes a content provider 102 (e.g., a broadcast network 102a, CDN/content store 102b), an adaptive streaming encoder/transcoder 104, an adaptive streaming server 106, a network 107 (e.g., IP network 107, CDN network 107), and clients 108. The adaptive streaming server 106 receives a request from a particular client 108a for a source video 110 and then retrieves the source video 110 from the content provider 102 (step 1). In this example, the broadcast network 102a has the requested source video 110 and provides the source video 110 to the adaptive streaming encoder/transcoder 104. The adaptive streaming encoder/transcoder 104 takes the source video 110 and generates multiple files 112a, 112b, 112c and 112d (for example) of the same video and audio content but which are encoded at different bit rates. For example, the adaptive streaming encoder/transcoder 104 can output a 4M bit rate file 112a, a 2M bit rate file 112b, a 1M bit rate file 112c and a 512K bit rate file 112d which are all key framed aligned with one another by PTSs/DTSs 114 (see FIG. 1B (PRIOR ART)). Thus, the 4M bit rate file 112a has a section 116a which contains the same video and audio content as the corresponding sections 116b, 116c and 116d of the 2M bit rate file 112b, the 1M bit rate file 112c and the 512K bit rate file 112d. However, the 4M bit rate file's section 116a has a higher quality than the 2M bit rate file's section 116b which has a higher quality than the 1M bit rate file's section 116c which in turn has a higher quality than the 512K bit rate file's section 116d.

The adaptive streaming server 106 includes a multicast packet escrow 118 which receives the multiple files 112a, 112b, 112c and 112d and a packet escrow database 120 (non-volatile storage) which stores the multiple files 112a, 112b, 112c and 112d. The adaptive streaming server 106 includes a segmenting unit 122 which functions to segment each of the stored files 112a, 122b, 112c, and 112d into multiple segment files $120a_{1-n}$, $120b_{1-n}$, $120c_{1-n}$, and $120d_{1-n}$ (see FIG. 1C (PRIOR ART)). The adaptive streaming server 106 includes a segment database 124 (non-volatile storage) which stores the segment files $120a_{1-n}$, $120b_{1-n}$, $120c_{1-n}$, and $120d_{1-n}$. Each segment file $120a_{1-n}$, $120b_{1-n}$, $120c_{1-n}$, and $120d_{1-n}$ contains video and audio packets for a predetermined time duration (e.g., 10 seconds). In this example, the segment files $120a_1$, $120b_1$, $120c_1$, and $120d_1$ (for example) would be associated with time codes t1-t2 and segment files $120a_4$, $120b_4$, $120c_4$, and $120d_4$ (for example) would be associated with time codes t4-t5.

The adaptive streaming server 106 has a HTTP server 126 which interfaces with the segment database 124 and creates a master manifest file 128 which includes child manifest files 130a, 130b, 130c and 130d (for example)(see FIG. 1D (PRIOR ART)). Each child manifest file 130a, 130b, 130c and 130d respectively includes references $132a_{1-n}$, $132b_{1-n}$, $132c_{1-n}$, and $132d_{1-n}$ to each of the segment files $120a_{1-n}$, $120b_{1-n}$, $120c_{1-n}$, and $120d_{1-n}$. The HTTP server 126 sends the master manifest file 128 through the network 107 to client 108a (step 2). Thereafter, the client 108a sends a request including one of the child manifest file's reference $132a_1$ (for example) through the network 107 to the HTTP server 126 (step 3). The HTTP server 126 uses the requested reference 132a, to retrieve and send the corresponding segment file 120a, through the network 107 to the client 108a which plays the segment file 120a, (step 4). The client 108a sends another request identifying one of the child manifest file's reference $132b_2$ (for example) through the network 107 to the HTTP server 126 (step 3'). The HTTP server 126 uses the requested references $132b_2$ to retrieve and send the corresponding segment file $120b_2$ through the network 107 to the client 108a which playbacks the segment file $120b_2$ (step 4'). The client 108a continues to send requests for specific segment files $120a_{3-n}$, $120b_{3-n}$, $120c_{3-n}$, and $120d_{3-n}$ (for example) and the HTTP server 126 sends the requested segment files $120a_{3-n}$, $120b_{3-n}$, $120c_{3-n}$, and $120d_{3-n}$, back to the client 108a which playbacks the received segment files $120a_{3-n}$, $120b_{3-n}$, $120c_{3-n}$, and $120d_{3-n}$ (steps 3"and 4"). In this way, the client 108a is able to playback the requested source video 110 while experiencing very little buffering and a fast start time so the user has a good experience for both high-end and low-end network connections.

In effect, the traditional adaptive streaming server 106 can accept live and on demand content streams. These content streams are divided into manageable segments of different qualities and written into files which are stored on a disk (shown as segment database 124). The clients 108 can then retrieve these files for video display by making HTTP queries to a primitive web server. However, there are several problems with the current solution:

Flexibility in dividing (chopping up) a segment file $120a_{1-n}$, $120b_{1-n}$, $120c_{1-n}$, and $120d_{1-n}$, is limited. Thus, extracting a subset of a segment becomes rather difficult.

The traditional adaptive server 106 requires redundant copies of VOD streams as the server 106 tries to store the original content file and all of its additional segment files $120a_{1-n}$, $120b_{1-n}$, $120c_{1-n}$, and $120d_{1-n}$.

Accordingly, there is a need to address these problems and other problems associated with the traditional adaptive server 106. This need and other needs are satisfied by the present invention.

SUMMARY

A streaming server, a method, and a system that address the aforementioned problems and other problems are described in the independent claims of the present application. Advantageous embodiments of the streaming server, the method, and the system have been described in the dependent claims of the present application.

In one aspect, the present invention provides a streaming server for providing a content stream through a network to a client. The streaming server comprises a server, a segmenting unit, and a random access memory unit. The server has an input interface configured to receive a request from the client to play the content stream. The segmenting unit is configured to receive the content stream and segment the content stream into a plurality of data structures, where the plurality of data structures encompass pointers which correspond to time codes and a reference to the unsegmented content stream. The random access memory unit is configured to store the plurality of data structures and the pointers. The server further comprises: (a) a processing unit configured to generate a manifest that includes a plurality references corresponding to a plurality of fragments of the content stream; (b) an output interface configured to send the manifest to the client; (c) the input interface is configured to receive a request from the client to fetch one of the fragments corresponding to the content stream; (d) the processing unit is configured to obtain bytes associated with the requested fragment from the data structures stored in the random access memory unit, where the processing unit uses a start time and a stop time associated with the requested fragment and computes the corresponding pointers associated with the plurality of data structures to look up bytes from the one or more data structures associated with the requested fragment; and (e) the output interface is configured to send the bytes associated with the requested fragment to the client. An advantage of the streaming server is that segmentation can be deferred until it becomes necessary to play the content stream.

In yet another aspect, the present invention provides a method implemented by a streaming server for providing a content stream through a network to a client. The method comprises the steps of: (a) receiving a request from the client to play the content stream; (b) receiving the content stream; (c) segmenting the content stream into a plurality of data structures, wherein the plurality of data structures encompass pointers which correspond to time codes and a reference to the unsegmented content stream; (d) storing the plurality of data structures and the pointers in a random access memory unit; (e) generating a manifest that includes a plurality references corresponding to a plurality of fragments of the content stream; (f) sending the manifest to the client; (g) receiving a request from the client to fetch one of the fragments corresponding to the content stream; (h) obtaining bytes associated with the requested fragment from the data structures stored in the random access memory unit by using a start time and a stop time associated with the requested fragment and computes the corresponding pointers associated with the plurality of data structures to look up bytes from the one or more data structures associated with the requested fragment; and (i) sending the bytes associated with the requested fragment to the client. An advantage of the method is that segmentation can be deferred until it becomes necessary to play the content stream.

In still yet another aspect, the present invention provides a system for providing a content stream to through a network to a client. The system comprises a content provider and a streaming server which interfaces with the client through the network. The streaming server is configured to: (a) receive a request from the client to play the content stream; (b) receive the content stream from the content provider; (c) segment the content stream into a plurality of data structures, where the plurality of data structures encompass pointers which correspond to time codes and a reference to the unsegmented content stream; (d) generate a manifest that includes a plurality references corresponding to a plurality of fragments of the content stream; (e) send the manifest to the client; (f) receive a request from the client to fetch one of the fragments corresponding to the content stream; (g) obtain bytes associated with the requested fragment from the data structures stored in the random access memory unit by using a start time and a stop time associated with the requested fragment and the pointers associated with the plurality of data structures to look up bytes from the one or more data structures associated with the requested fragment; and (h) send the bytes associated with the requested fragment to the client. An advantage of the streaming server is that segmentation can be deferred until it becomes necessary to play the content stream.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIGS. 1A-1D (PRIOR ART) are several diagrams used to help explain how a traditional system can provide a content stream through a network to a client;

FIG. 2 is a diagram of an exemplary system configured to provide a content stream through a network to a client in accordance with an embodiment of the present invention;

FIG. 7 is a diagram of an exemplary system including an adaptive streaming server configured to receive a on-demand content stream and then adaptively deliver the on-demand content stream via an IP network to one or more clients in accordance with an another embodiment of the present invention.

DETAILED DESCRIPTION

Figure 1A:
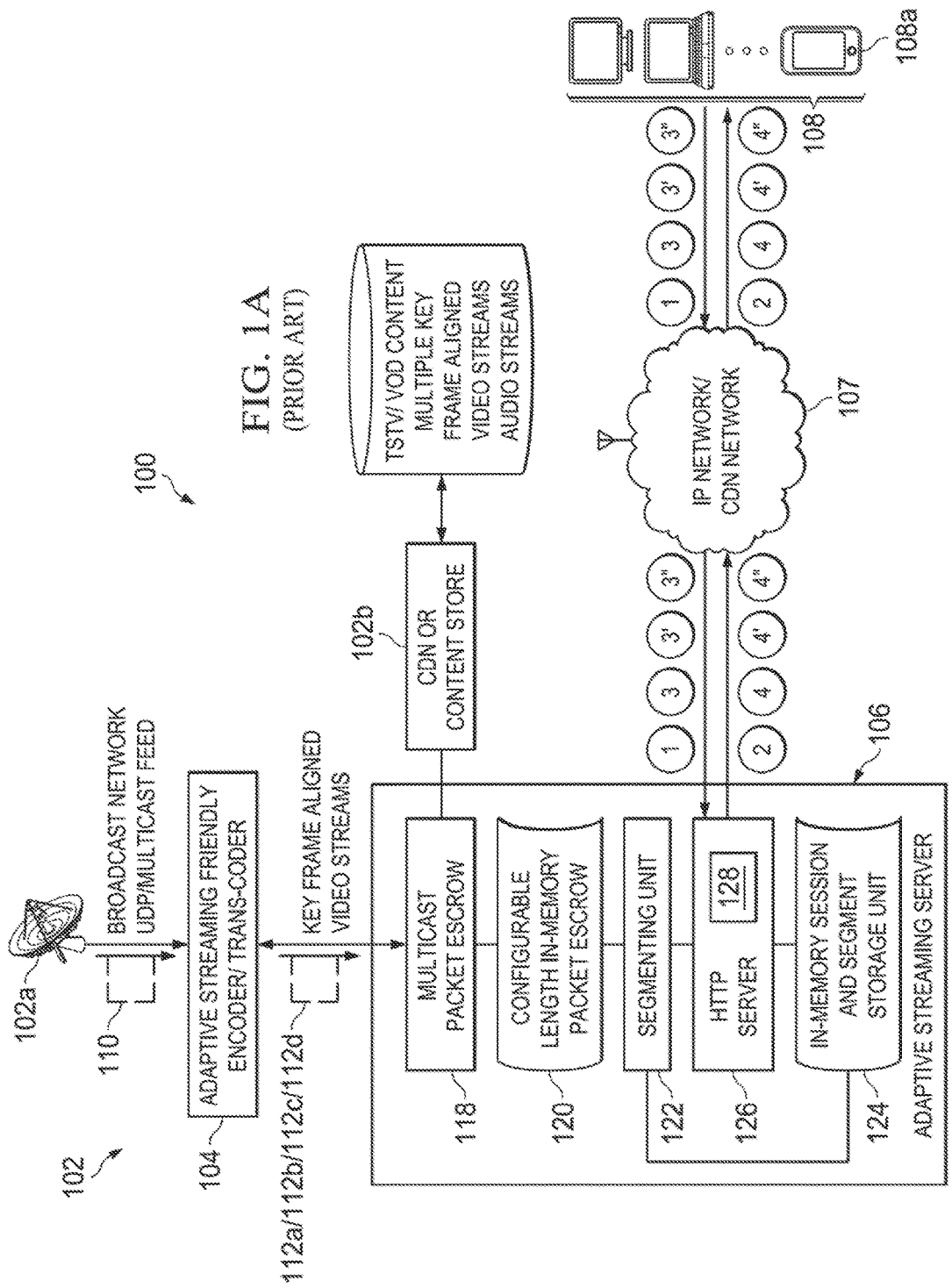
Figure 1B:
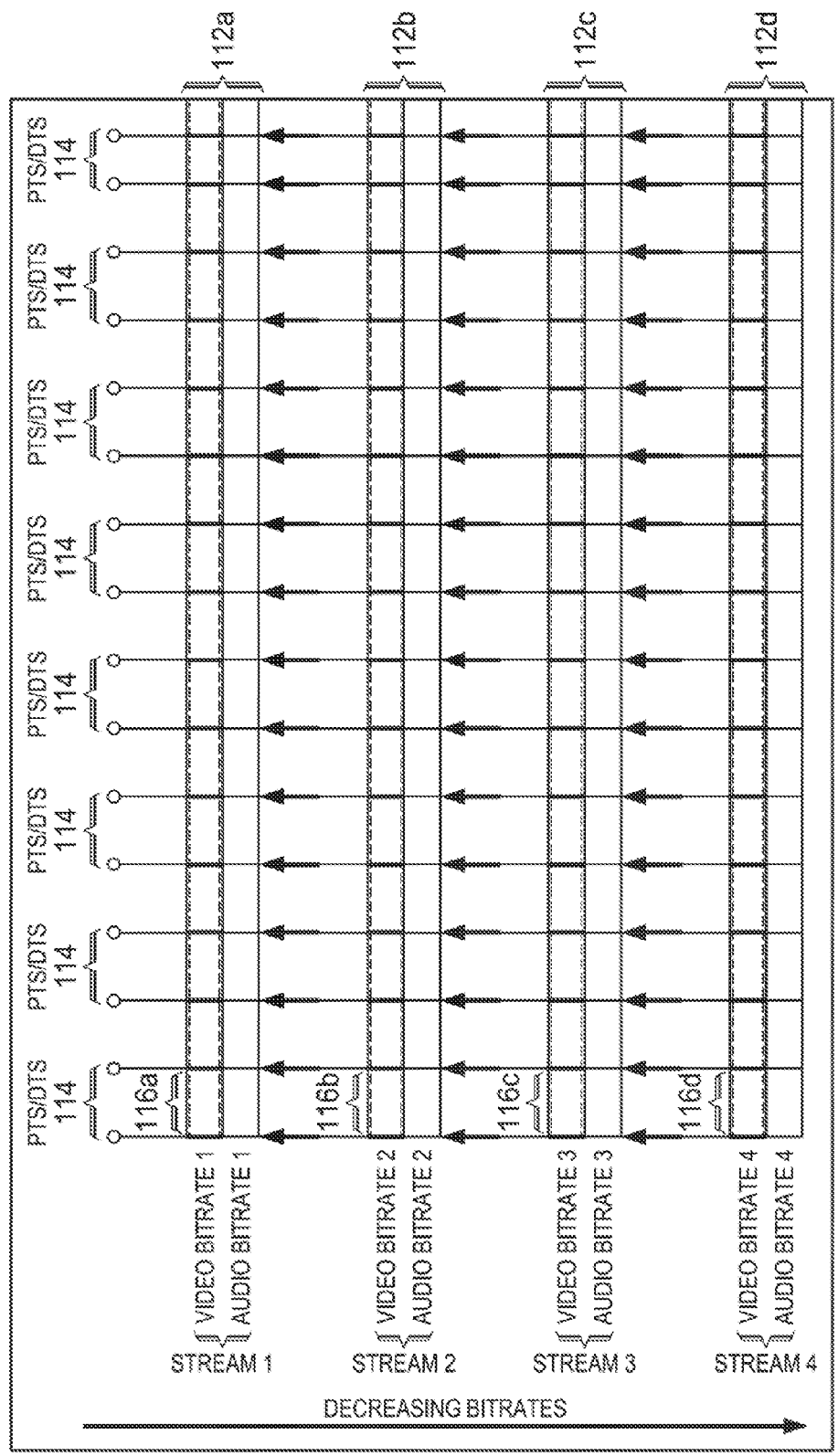
Figure 1D:
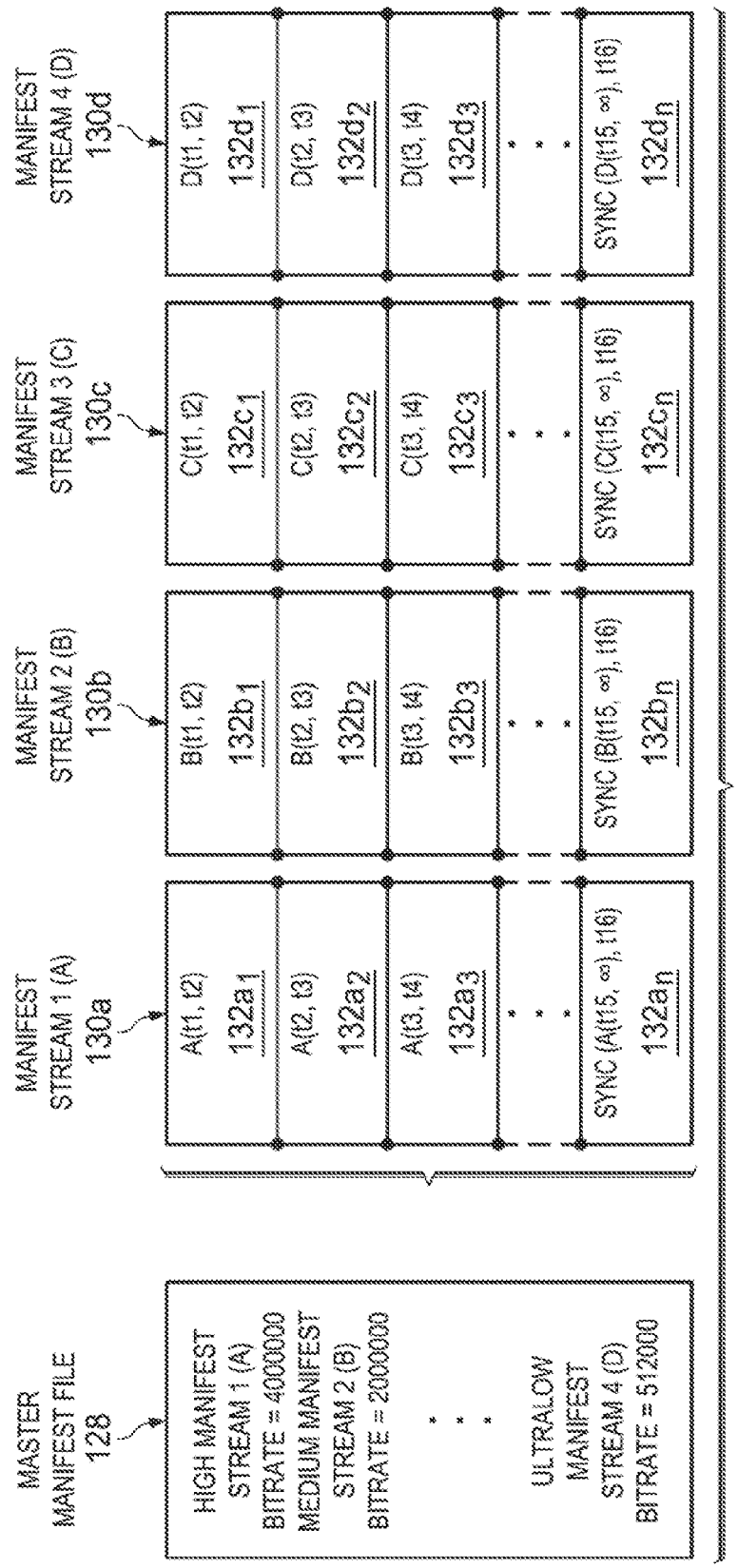

Referring to FIG. 2, there is a diagram of an exemplary system 200 configured to provide a content stream 203 through a network 208 to a client 202 in accordance with an embodiment of the present invention. The system 200 includes a content provider 204 and a streaming server 206. The content provider 204 interfaces with the streaming server 206 which in turn interfaces with the client 202 (only one shown) through the network 208 (e.g., IP network 208, CDN network 208, wireless network 208 or any combination thereof). Alternatively, the content provider 204 may be connected to the streaming server 206 through the network 208. The streaming server 206 includes a segmenting unit 210, a random access memory 211 (volatile storage 211), and a server 212 (e.g., HTTP server 212).

The server 212 further includes an input interface 216, a processing unit 218, and an output interface 220. In this example, the processing unit 218 includes a processor 218a which executes process-executable instructions stored in a memory 218a (e.g., non-volatile memory 218a) to enable the operations described below. The input interface 216 is configured to receive a request from the client 202 to play the content stream 203 (step 1). The segmenting unit 210 is configured to receive one file of the content stream 203 or multiple files of the content stream 203 where the multiple files are encoded at different bit rates (step 2). For example, the content provider 204 (e.g., CDN content store 204) may provide the file or multiple files of the content stream 203 (see FIG. 7). Or, the content provider 204 (e.g., broadcast network 204a) may provide a single file of the content stream 203 to an adaptive streaming friendly encoder/transcoder which then generates the file or multiple files of the content stream 203 and provides the file or multiple files to the segmenting unit 210 (see FIG. 6).

The segmenting unit 210 is further configured to segment the file or each of the multiple files into a plurality of data structures (not segment files) which encompass pointers which correspond to time codes and a reference to the unsegmented content stream (step 3). The random access memory 211 (volatile memory) is configured to store the data structures of the file or the multiple files of the content stream 203 (step 4). The processing unit 218 is configured to generate a manifest if there is one file of the content stream 203 or a master manifest if there are multiple files of the content stream 203 (step 5). The manifest or master manifest would be stored in the random access memory unit 211. In one example, the manifest includes references (e.g., URLs) corresponding to fragments (e.g., 10 second fragments) of the content stream 203. In another example, the master manifest includes multiple child manifests (e.g., child manifest) (step 5). For instance, the first child manifest has references (e.g., URLs) corresponding to fragments (e.g., 10 second fragments) having a first bit rate of the content stream 203, the second child manifest has references (e.g., URLs) corresponding to fragments (e.g., 10 second fragments) having a second bit rate of the content stream 203 etc. . . . where the first bit rate is higher than the second bit rate etc. . . . The output interface 220 is configured to send the manifest or master manifest to the client 202 (step 6). The input interface 216 is configured to receive a request from the client 202 to fetch a specific one of the fragments corresponding to the content stream 203 (step 7). The processing unit 218 is configured to obtain bytes associated with the requested fragment from the data structures stored in the random access memory unit 111. For example, the processing unit 218 uses a start time and a stop time associated with the requested fragment and computes the corresponding pointers associated with the data structures to lookup bytes from the one or more data structures associated with the requested fragment (step 8). The processing unit 218 when looking-up the bytes from the one or more data structures associated with the requested fragment can be configured to perform an interpolation if need to obtain the bytes of the requested fragment. The output interface 220 is configured to send the requested fragment to the client 202 (step 9). Thereafter, steps 7-9 would be repeated so the client 202 can obtain and playback the content stream 203.

Figure 3:
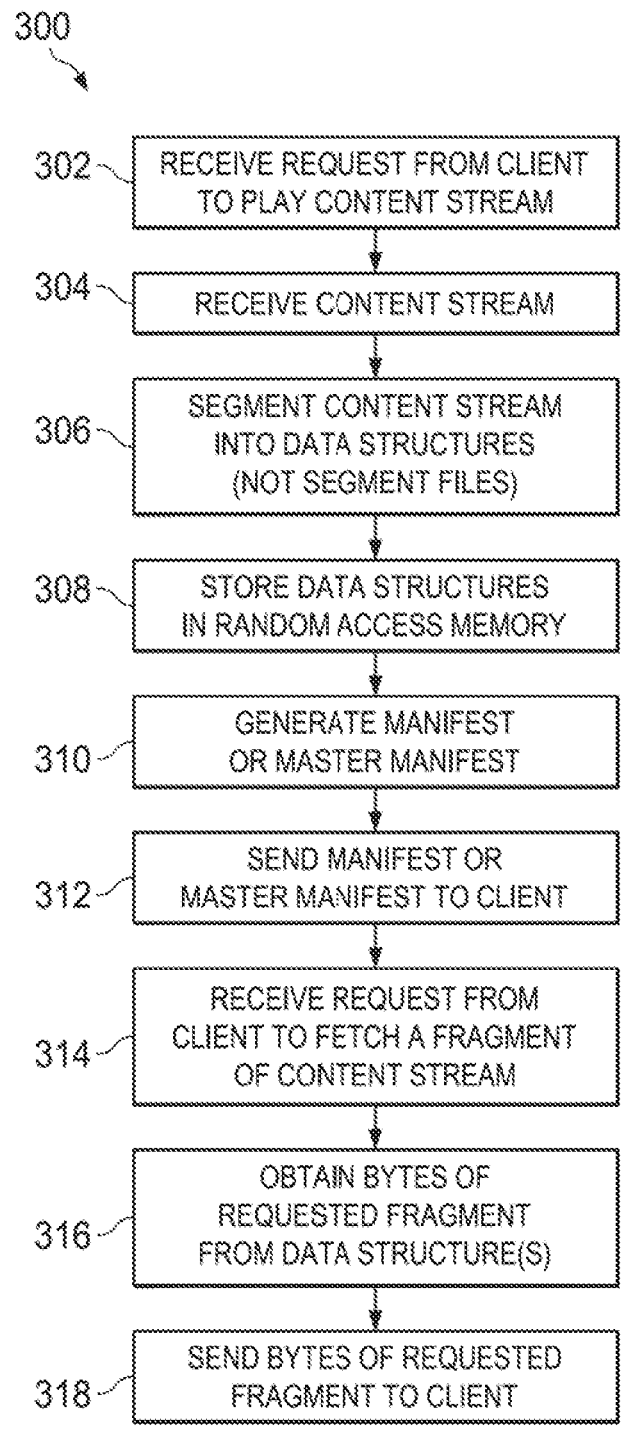
FIG. 3 is a flowchart illustrating the steps of an exemplary method implemented by an adaptive streaming server to provide a content stream through a network to a client in accordance with an embodiment of the present invention.

Referring to FIG. 3, there is a flowchart illustrating the steps of an exemplary method 300 implemented by the streaming server 206 to provide the content stream 203 through the network 208 to the client 202 in accordance with an embodiment of the present invention. At step 302, the streaming server 206 receives a request from the client 202 to play the content stream 203. At step 304, the streaming server 206 receives one file or multiple files of the content stream 203 where the multiple files are encoded at different bit rates. At step 306, the streaming server 206 segments the file or each of the multiple files into a plurality of data structures (not segment files) which encompass pointers which correspond to time codes and a reference to the unsegmented content stream. At step 308, the streaming server 206 stores the data structures in the random access memory 211. At step 310, the streaming server 206 generates a manifest (if one file of the content stream 203 is used) or a master manifest (if multiple files with different encoding rates of the content stream 203 are used). At step 312, the streaming server 206 sends the manifest or master manifest to the client 202. At step 314, the streaming server 206 receives a request from the client 203 to fetch a specific one of the fragments corresponding to the content stream 203. At step 316, the streaming server 206 obtains bytes associated with the requested fragment from the data structures stored in the random access memory unit 111. For example, the streaming server 206 uses a start time and a stop time associated with the requested fragment and computes the corresponding pointers associated with the plurality of data structures to lookup bytes from the one or more data structures associated with the requested fragment. The streaming server 206 when looking-up the bytes from the one or more data structures associated with the requested fragment can be configured to perform an interpolation if need to obtain the bytes of the requested fragment. At step 318, the streaming server 206 sends the requested fragment to the client 202. Thereafter, steps 314, 316 and 318 would be repeated so the client 202 can obtain and playback the content stream 203.

Hence, the streaming server 206 in accordance with an embodiment of the present invention addresses the aforementioned problems of the prior art by implementing the following:

1. VOD and Multi-Program Live Transport Streams both should only be parsed for Single-Program Adaptive Transport Streaming when they are needed by a client. Then, the streaming server 206 in creating an adaptive stream need only require that the content be broken up into data structures which are stored in random access memory 211 (volatile storage) rather than breaking up the content into locally segmented files stored on disk (non-volatile storage). These data structures will be available for clients 202 to retrieve as a file stream.

2. While parsing a stream, the streaming server 206 creates a manifest or master manifest that contains a set of virtual pointers to the data structures which the stream is broken out into. This allows a client 202 to play the content stream 203 in the same manner it would with any traditional adaptive streaming system but the content stream 203 will be available much faster due to the data structures and the client 202 does not need to have knowledge about the storage format and management of the content's data in the streaming server 206.

A set of data for an exemplary data structure is as follows:

```
public class SimplePacketSpan
    extends AbstractPacketSpan
{private final long s0; // segment start time
    private final long e0; // segment end time
OneFileStore enclosing; // packet database
}
public class OneFileStore
{private long end; // packet database end time
    private long start; // packet database start time
    protected TransportPacketBag bag; //reference to packets stored on
    disk
    protected PCRSlope slope; // "object" (algorithm+data) allows one to
map from a time to the corresponding packets on disk. An exemplary
implementation uses linear interpolation
}
```

A detailed discussion about several exemplary ways that the streaming server 206 can implement the aforementioned method 300 is provided below with respect to FIGS. 4-6.

Figure 4:
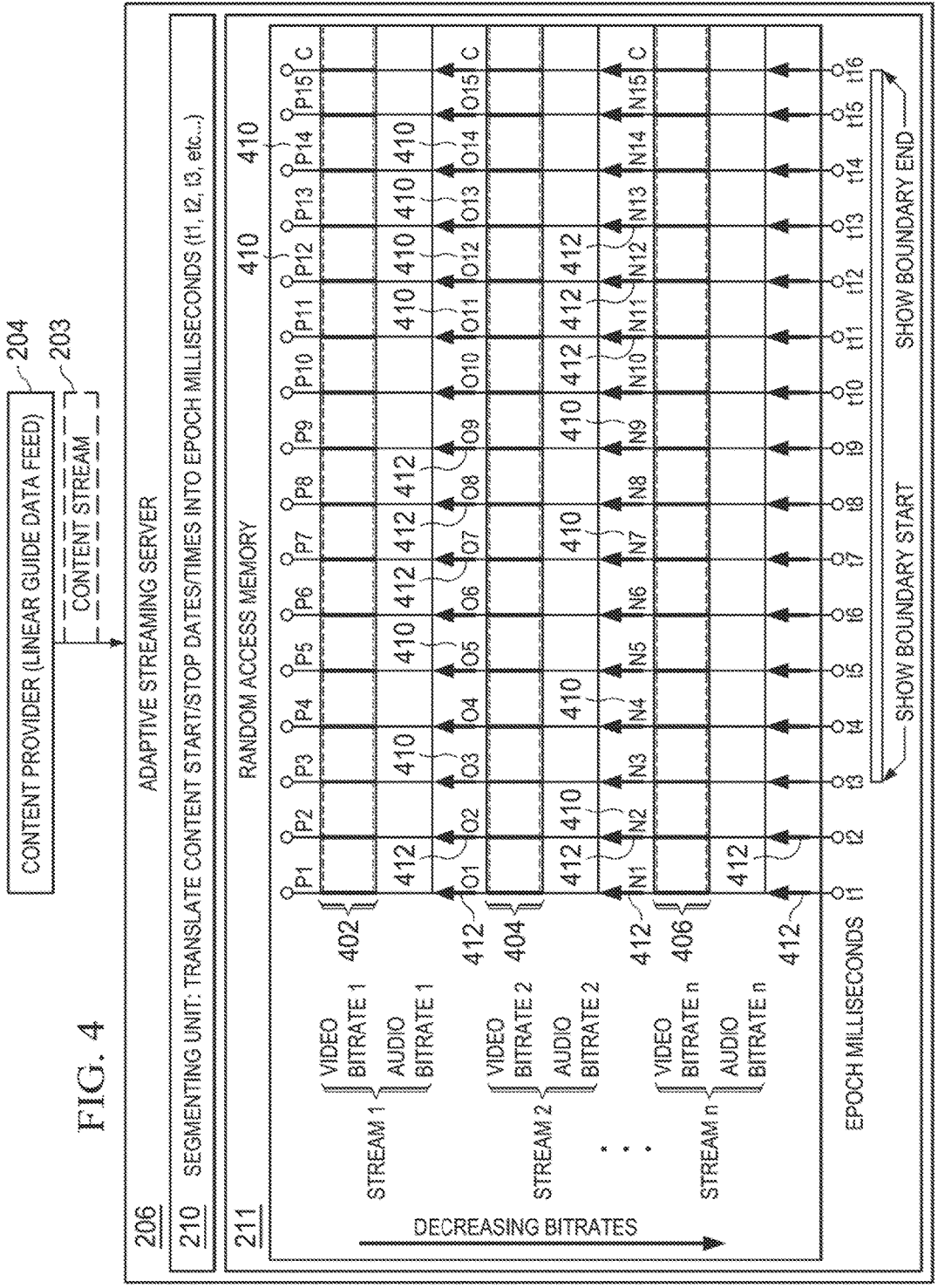
FIG. 4 is a diagram used to help explain one way that an adaptive streaming server can segment the content stream into data structures (virtual files) in accordance with an embodiment of the present invention.

Referring to FIG. 4, there is a diagram which shows one way how the streaming server 206 (e.g., adaptive streaming server 206) can segment the content stream 203 into data structures 402, 404 and 406 (virtual files) in accordance with an embodiment of the present invention. In particular, this diagram shows the following:

1. A snapshot of the random access memory 211 denoting the data structures 402, 404 and 406 that make up the different qualities of the content stream 203 which the adaptive streaming server 206 has segmented.
2. Each letter number combination (P1, P2 . . . P15, Q1, Q2 . . . Q15, N1, N2 . . . N 15) references a specific pointer 412 to a segment boundary in the content stream 203
3. The adaptive streaming server 206 can use the linear guide data feed to segment (chop) the content stream 206 to obtain the subset of data structures 402, 404 and 406 that reference a program.

Figure 5A:
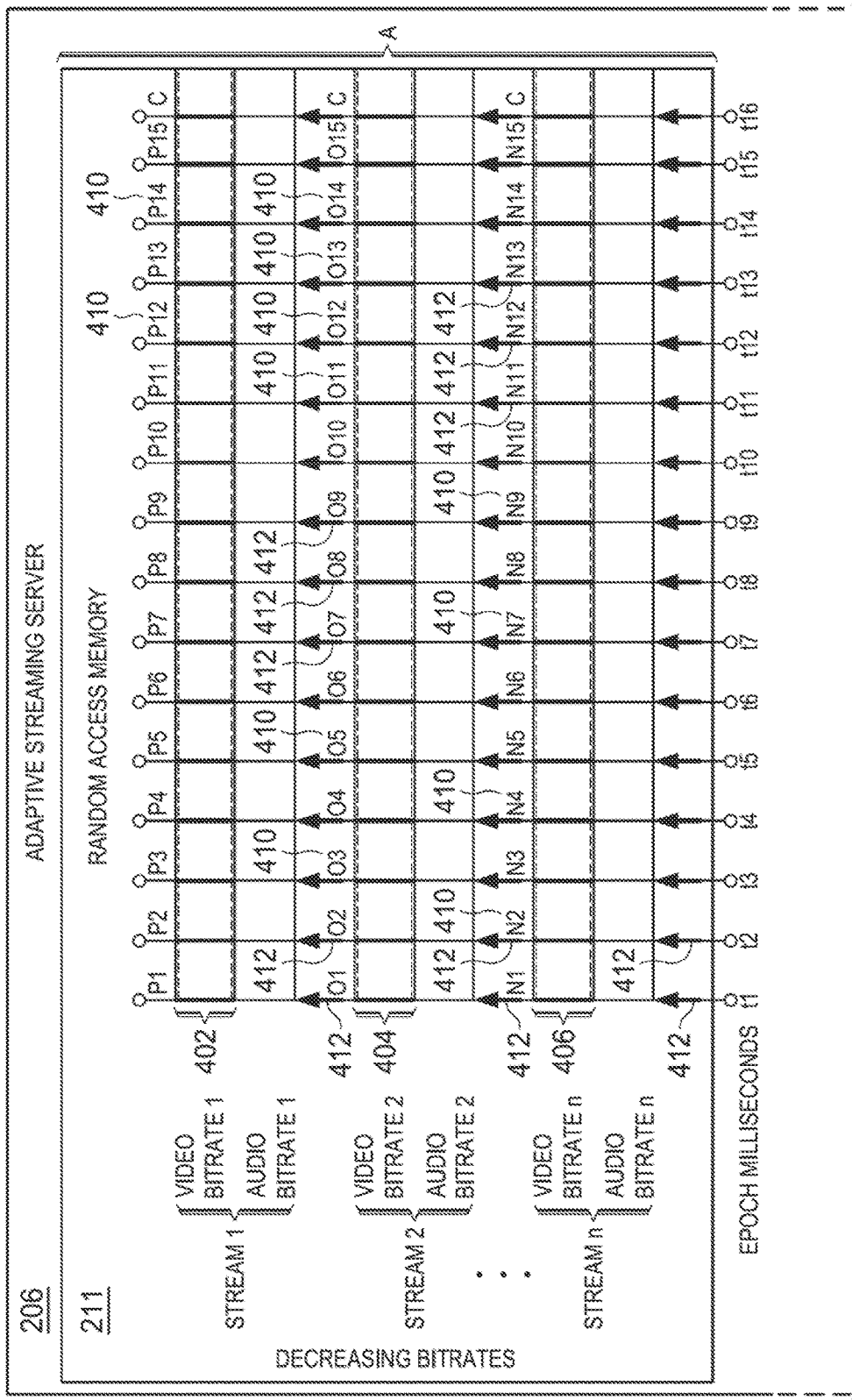
FIGS. 5A-5B are diagrams used to help explain one way that an adaptive streaming server can segment the video to place into the data structures plus how it can scan on further into the content stream to ensure the corresponding audio packets are also contained in the correct data structures so that both audio and video time stamps match up in the content stream in accordance with an embodiment of the present invention.
Figure 5B:
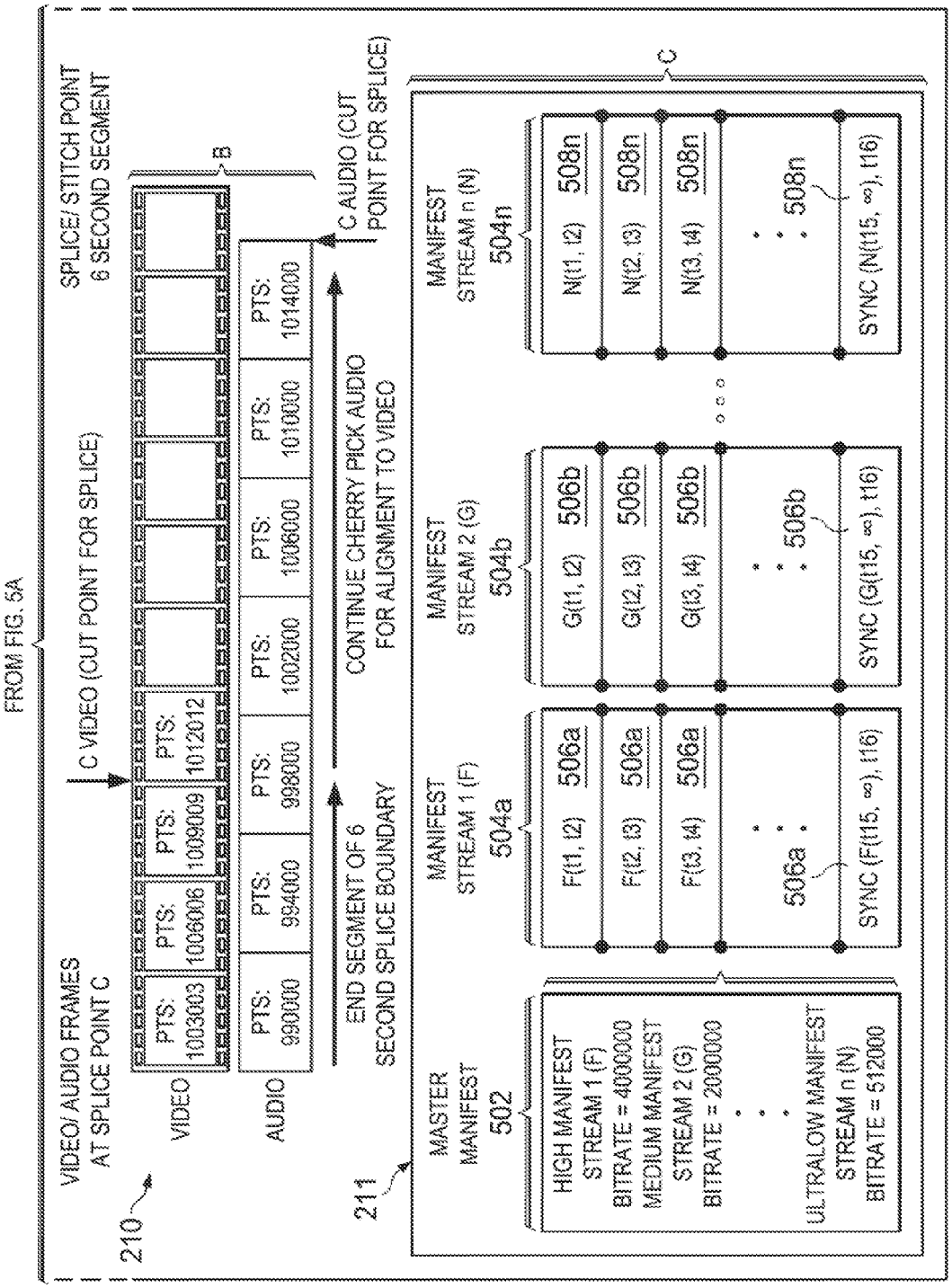

Referring to FIGS. 5A-5B, there are diagrams which show on way how the streaming server 206 (e.g., adaptive streaming server 206) can segment the video to place into the data structures 402, 404 and 406 (see alphanumeric A) plus how it can scan on further into the content stream 203 to ensure the corresponding audio packets are also contained in the correct data structures 402, 404 and 406 so that both audio and video time stamps match up in the content stream 203 (see alphanumeric B). This provides the flexibility to cut new virtual segments and subsets anywhere in the content stream 203 in a fraction of the time when compared to the state of the art as the content stream 203 is being delivered to a client 202. For example, one can use the adaptive streaming server 206 to combine parts of any two different encoded video files if desired such as combining an advertisement into the content stream. In addition, the diagrams show how the adaptive streaming server 206 can generate a master manifest 502 (see alphanumeric C). The master manifest includes multiple child manifests 504a, 504b . . . 504n (e.g., child manifests 504a, 504b . . . 504n). For example, the first child manifest 504a has multiple references 506a (e.g., URLs) corresponding to fragments (e.g., 10 second fragments) having a first bit rate of the content stream 203. The second child manifest 504b has references 506b (e.g., URLs) corresponding to fragments (e.g., 10 second fragments) having a second bit rate of the content stream 203. The nth child manifest 504n has references 506n (e.g., URLs) corresponding to fragments (e.g., 10 second fragments) having a nth bit rate of the content stream 203. The first bit rate is higher than the second bit rate which is higher than the nth bit rate.

Figure 6:
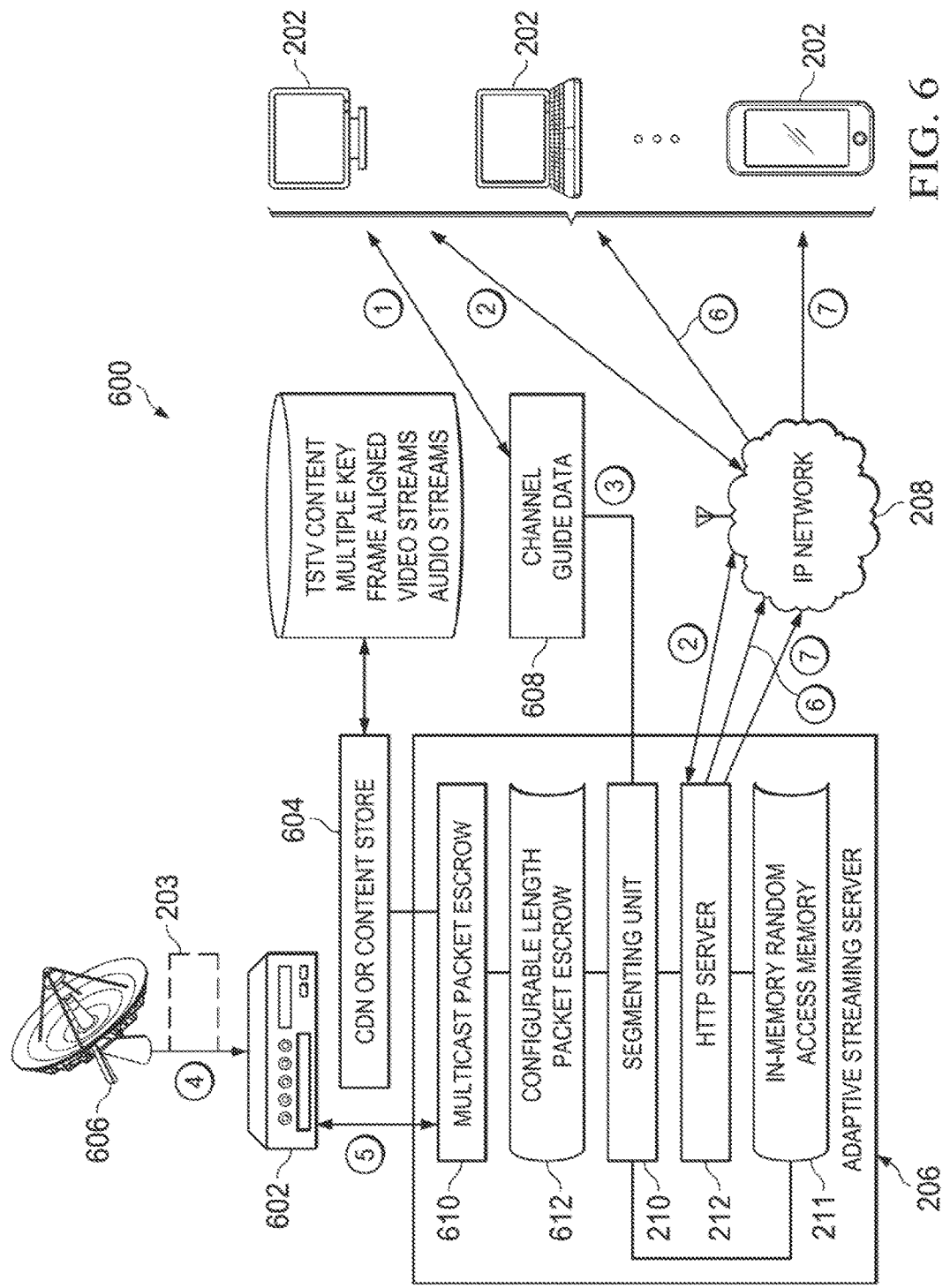
FIG. 6 is a diagram of an exemplary system including an adaptive streaming server configured to receive a live content stream and then adaptively deliver the live content stream via an IP network to one or more clients in accordance with an embodiment of the present invention.

Referring to FIG. 6, there is a diagram of an exemplary system 600 including the streaming server 206 (e.g., adaptive streaming server 206) configured to receive a live content stream 203 and then adaptively deliver the live content stream 203 via an IP network 208 to one or more clients 202 in accordance with an embodiment of the present invention. The adaptive streaming server 206 is configured to create the live content stream 203 to be delivered to one or more clients 202 by segmenting the live content stream 203 into data structures which are stored in random access memory 211 (volatile storage 211) rather than segmenting the live content stream 203 into segment files which are stored on a disk or within a database (non-volatile storage). In this example, the adaptive streaming server 206 includes a multicast packet escrow 610, a configurable length non-volatile memory packet escrow 612 (which stores the content stream 203), the segmenting unit 210, the server 212, and the random access memory 211. The exemplary system 600 which enables adaptive streaming in a broadcast start-over-time shifted television (TSTV) environment includes the following components:

- Adaptive Streaming Clients 202: personal computers, mobile phones/tablets, http capable televisions, etc.
- Adaptive Streaming Friendly Encoder/Trans-coder 602—Ensures that any content stream 203 which the adaptive streaming server 206 receives as input will be in a manageable format.
- Adaptive Streaming Server 206—Handles segmenting the content stream 203 into data structures and producing streams for the adaptive streaming clients 202 (see FIGS. 2 and 3). Although, an adaptive streaming server 206 is described herein it should be appreciated that the present invention also includes a streaming server that works on a stream that has only a single bit rate.
- CDN or Content Store 604—Content Distribution Network or Storage system where content streams 203 can be warehoused after being received from different ingestions inlets.

The exemplary system 600 may include many other well known components but for clarity those well known components are not described herein while the components 202, 206, 602, 604, 606 which are relevant to the present invention have been described herein. The exemplary system 600 is configured to provide a finished live adaptive content stream 203 to one or more requesting clients 202 (only three shown) per the following steps:

1. The adaptive streaming clients 202 have access to a channel line-up and guide data listings 608 to find out what programs (content streams 203) are currently available.
2. The adaptive streaming clients 202 locate a program (content stream 203) to watch and a request to play the broadcast live or TSTV program (content stream 203) is made to the adaptive streaming server 206. It should be noted a VOD stream has a beginning and an end while a broadcast stream has a beginning and then grows with time.
3. The adaptive streaming server 206 also has access to the channel lineup and guide data listing 608. The adaptive streaming server 206 uses this information to locate the requested content stream 203.
4. In this case, the requested key frame aligned content stream 203 is arriving off the broadcast feed in a multi-program transport stream format from the broadcast network 606. Alternatively, the CDN 604 could contain the requested content stream 203
5. The adaptive streaming friendly encoder/trans-coder 602 reformats the content stream 203 from the broadcast network 606 as required and provides the reformatted content stream 203 as input to the adaptive streaming server 206. The adapted streaming server 206 upon receiving the properly formatted content stream 203 segments the content stream 203 to create a set of data structures which are stored in the random access memory. If the content stream 203 is in a multi-program transport stream format then the adaptive streaming server 206 will demultiplex each content stream (with same content but different bit rates) into their own set of data structures in single-program transport stream formats.
6. The adaptive streaming server 206 sends the master manifest which references fragments of the content stream 203 to the clients 202. The master manifest can be unique per client 202 and is a set of references to fragments of the content stream 203 that the adaptive streaming server 206 can create on demand.
7. The content stream 203 itself is delivered to the client as a set of segmented files however the data structures referenced by the master manifest were used to accomplish this. In other words, no static segment files from a disk or database (non-volatile storage) in the traditional way were required in order to deliver the content stream 203.

Referring to FIG. 7, there is a diagram of an exemplary system 700 including the streaming server 206 (e.g., adaptive streaming server 206) configured to receive a on-demand content stream 203 and then adaptively deliver the on-demand content stream 203 via an IP network 208 to one or more clients 202 in accordance with an another embodiment of the present invention. The adaptive streaming server 206 is configured to create the on-demand content stream 203 to be delivered to one or more clients 203 by segmenting the on-demand content stream 203 into data structures which are stored in random access memory 211 (volatile storage 211) rather than segmenting the on-demand content stream 203 into segment files which are stored on a disk or within a database (non-volatile storage). In this example, the adaptive streaming server 206 includes the segmenting unit 210, the server 212, and the random access memory 211. The exemplary system 700 which enables adaptive streaming in a video-on-demand environment includes the following components:

- Adaptive Streaming Clients 202: personal computers, mobile phones/tablets, http capable televisions, etc.
- Adaptive Streaming Server 206—Handles segmenting the content stream 203 into data structures and producing streams for the adaptive streaming clients 202 (see FIGS. 2 and 3). Although, an adaptive streaming server 206 is described herein it should be appreciated that the present invention also includes a streaming server that works on a stream that has only a single bit rate.
- CDN or Content Store 604—Content Distribution Network or Storage system where content streams 203 can be warehoused after being received from different ingestions inlets.
- VOD Content 203—Multiple key frame aligned video/audio streams 203. It should be noted a VOD stream has a beginning and an end while a broadcast stream has a beginning and then grows with time.

The exemplary system 700 may include many other well known components but for clarity those well known components are not described herein while the components 202, 206, 602, and 604 which are relevant to the present invention have been described herein. The exemplary system 700 is configured to provide a finished on-demand adaptive content stream 203 to one or more requesting clients 202 (only three shown) per the following steps:

1. The adaptive streaming clients 202 makes a request to the adaptive streaming server 206 for play of a VOD asset (on-demand content stream 203).
2. The adaptive streaming server 206 retrieves the requested key framed aligned VOD content stream 203 from the CDN 604 and segments the retrieved content stream 203 creating a set of data structures to send to the clients 202.
3. The adaptive streaming server 206 sends the manifest which references fragments of the content stream 203 to the clients 202. The manifest can be unique per client 202 and is a set of pointers to locations in the content stream 203 that the adaptive streaming server 206 is now creating.
4. The content stream 203 itself is delivered to the client as a set of segmented files however the data structures referenced by the manifest were used to accomplish this. In other words, no static segment files from a disk or database (non-volatile storage) in the traditional way were required in order to deliver the content stream 203.

In view of the foregoing, one should appreciate that the adaptive streaming server 206 which is configured to deliver an adaptive content stream 203 from managed data structures rather than static files has many advantages (for example).

The content streams 203 can now be made available to clients 202 before their segmentation is completed by the segmenting unit 210. This provides faster service delivery to clients 203 when dealing with live content streams 203.

The adaptive streaming server 206 on the fly can change segment boundaries and extract subsets of the content stream 203 for the client 202 without having to create new files. Being able to redefine segment boundaries greatly enhances how the adaptive streaming server 206 can manage its content. It also makes it easier for the adaptive streaming server 206 to insert advertisement or alternative stream into the content stream 203.

Stream segmentation happens only when it becomes necessary to play the content stream 203. This is a huge savings in space consumption on the adaptive streaming server 206.

The traditional adaptive streaming server had limited flexibility in dividing (chopping up) a segment file which made extracting a subset of a segment rather difficult. The adaptive streaming server 206 addresses this problem by including logic which can segment the file at any boundary on-demand. This logic is used for every segment and is not a special case.

The traditional adaptive server requires redundant copies of VOD streams as the server tries to store the original content file and all of its additional segment files. The adaptive streaming server 206 addresses this problem by computing the segments on-demand instead of storing the segments in files.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. A streaming server comprising:
   a processing unit;
   a random access memory unit coupled to the processing unit; and
   wherein the streaming server is configured to receive a request to play a content stream, receive the content stream, segment the content stream into a plurality of data structures rather than into a plurality of segment files, and store the plurality of data structures in the random access memory unit.

2. The streaming server of claim 1, wherein the plurality of data structures encompass (1) a reference to the content stream and (2) pointers which correspond to time codes to the content stream.

3. The streaming server of claim 1, where the streaming server is configured to segment the content stream into the plurality of data structures only when it becomes necessary to output one or more fragments of the content stream.

4. The streaming server of claim 1, wherein the content stream is one of a single program transport stream, a multi-program transport stream, a video-on-demand content stream, or a live content stream.

5. A method in a streaming server, the method comprising:
   receiving a request to play a content stream;
   receiving the content stream;
   segmenting the content stream into a plurality of data structures rather than into a plurality of segment files; and
   storing the plurality of data structures in a random access memory unit.

6. The method of claim 5, wherein the plurality of data structures encompass (1) a reference to the content stream and (2) pointers which correspond to time codes to the content stream.

7. The method of claim 5, where the content stream is segmented into the plurality of data structures only when it becomes necessary to output one or more fragments of the content stream.

8. The method of claim 5, wherein the content stream is one of a single program transport stream, a multi-program transport stream, a video-on-demand content stream, or a live content stream.

9. A streaming server for providing a content stream through a network to a client, the streaming server comprising:
   a Hypertext Transfer Protocol (HTTP) server comprising an input interface at which there is received a request from the client to play the content stream;
   a segmenting unit configured to receive the content stream and segment the content stream into a plurality of data structures rather than into a plurality of segment files, wherein the plurality of data structures encompass (1) a reference to the content stream and (2) pointers which correspond to time codes to the content stream;
   a random access memory unit configured to store the plurality of data structures;
   the HTTP server further comprising:
      a processing unit configured to generate a manifest that includes a plurality references corresponding to a plurality of fragments of the content stream;
      an output interface from which the manifest is sent to the client;

the input interface at which there is received a request from the client to fetch one of the fragments corresponding to the content stream;

the processing unit configured to obtain bytes associated with the requested fragment from the data structures stored in the random access memory unit, wherein the processing unit is configured to use time codes associated with the requested fragment to lookup bytes from one or more of the data structures associated with the requested fragment; and the output interface from which there is sent the bytes associated with the requested fragment to the client.

10. A streaming server for providing a content stream through a network to a client, the streaming server comprising:

a Hypertext Transfer Protocol (HTTP) server comprising an input interface at which there is received a request from the client to play the content stream;

a segmenting unit configured to receive the content stream and segment the content stream into a plurality of data structures, wherein the plurality of data structures encompass (1) a reference to the content stream and (2) pointers which correspond to time codes to the content stream;

a random access memory unit configured to store the plurality of data structures;

the HTTP server further comprising:

a processing unit configured to generate a manifest that includes a plurality references corresponding to a plurality of fragments of the content stream;

an output interface from which the manifest is sent to the client;

the input interface at which there is received a request from the client to fetch one of the fragments corresponding to the content stream;

the processing unit configured to obtain bytes associated with the requested fragment from the data structures stored in the random access memory unit, wherein the processing unit is configured to use time codes associated with the requested fragment to lookup bytes from one or more of the data structures associated with the requested fragment, wherein the processing unit is configured to perform an interpolation operation when looking-up the bytes from the one or more data structures associated with the requested fragment; and the output interface from which there is sent the bytes associated with the requested fragment to the client.

11. A streaming server for providing a content stream through a network to a client, the streaming server comprising:

a Hypertext Transfer Protocol (HTTP) server comprising an input interface at which there is received a request from the client to play the content stream;

a segmenting unit configured to receive the content stream and segment the content stream into a plurality of data structures, wherein the plurality of data structures encompass (1) a reference to the content stream and (2) pointers which correspond to time codes to the content stream;

a random access memory unit configured to store the plurality of data structures;

the HTTP server further comprising:

a processing unit configured to generate a manifest that includes a plurality references corresponding to a plurality of fragments of the content stream;

an output interface from which the manifest is sent to the client, wherein the HTTP server is configured to send the manifest to the client before the segmenting unit completes segmenting the content stream into the plurality of data structures;

the input interface at which there is received a request from the client to fetch one of the fragments corresponding to the content stream;

the processing unit configured to obtain bytes associated with the requested fragment from the data structures stored in the random access memory unit, wherein the processing unit uses time codes associated with the requested fragment to lookup bytes from one or more of the data structures associated with the requested fragment; and the output interface from which there is sent the bytes associated with the requested fragment to the client.

12. The streaming server of claim 9, where the segmenting unit is configured to segment the content stream into the plurality of data structures only when it becomes necessary to provide one or more of the fragments of the content stream to the client.

13. The streaming server of claim 9, wherein:

the client is an adaptive streaming capable client; and the content stream is one of a single program transport stream, a multi-program transport stream, a video-on-demand content stream or a live content stream.

14. A method in a streaming server for providing a content stream through a network to a client, the method comprising:

receiving a request from the client to play the content stream;

receiving the content stream;

segmenting the content stream into a plurality of data structures rather than into a plurality of segment files, wherein the plurality of data structures encompass (1) a reference to the content stream and (2) pointers which correspond to time codes to the content stream;

storing the plurality of data structures in a random access memory unit;

generating a manifest that includes a plurality references corresponding to a plurality of fragments of the content stream;

sending the manifest to the client;

receiving a request from the client to fetch one of the fragments corresponding to the content stream;

obtaining bytes associated with the requested fragment from the data structures stored in the random access memory unit by using time codes associated with the requested fragment to lookup bytes from one or more of the data structures associated with the requested fragment; and sending the bytes associated with the requested fragment to the client.

15. A method in a streaming server for providing a content stream through a network to a client, the method comprising:

receiving a request from the client to play the content stream;

receiving the content stream;

segmenting the content stream into a plurality of data structures, wherein the plurality of data structures encompass (1) a reference to the content stream and (2) pointers which correspond to time codes to the content stream;

storing the plurality of data structures in a random access memory unit;

generating a manifest that includes a plurality references corresponding to a plurality of fragments of the content stream;

sending the manifest to the client;

receiving a request from the client to fetch one of the fragments corresponding to the content stream;

obtaining bytes associated with the requested fragment from the data structures stored in the random access memory unit by using time codes associated with the requested fragment to lookup bytes from one or more of the data structures associated with the requested fragment, wherein the obtaining step further comprises an interpolation step when looking-up the bytes from the one or more data structures associated with the requested fragment; and sending the bytes associated with the requested fragment to the client.

16. A method in a streaming server for providing a content stream through a network to a client, the method comprising:

receiving a request from the client to play the content stream;

receiving the content stream;

segmenting the content stream into a plurality of data structures, wherein the plurality of data structures encompass (1) a reference to the content stream and (2) pointers which correspond to time codes to the content stream;

storing the plurality of data structures in a random access memory unit;

generating a manifest that includes a plurality references corresponding to a plurality of fragments of the content stream;

sending the manifest to the client, wherein the manifest is sent to the client before completing the segmenting the content stream into the plurality of data structures;

receiving a request from the client to fetch one of the fragments corresponding to the content stream;

obtaining bytes associated with the requested fragment from the data structures stored in the random access memory unit by using time codes associated with the requested fragment to lookup bytes from one or more of the data structures associated with the requested fragment; and sending the bytes associated with the requested fragment to the client.

17. The method of claim 14, wherein the segment operation is performed only when it becomes necessary to provide one or more of the fragments of the content stream to the client.

18. The method of claim 14, wherein:

the client is an adaptive streaming capable client; and the content stream is one of a single program transport stream, a multi-program transport stream, a video-on-demand content stream or a live content stream.

* * * * *